United States Patent [19]
Storrer

[11] 3,767,868

[45] Oct. 23, 1973

[54] ELECTRIC CURRENT COLLECTOR SHOE

[75] Inventor: Rolf Storrer, Obergerlafingen, Switzerland

[73] Assignee: Von Roll AG., Gerlafingern, Switzerland

[22] Filed: Mar. 31, 1972

[21] Appl. No.: 240,008

[30] Foreign Application Priority Data
Apr. 5, 1971  Switzerland.......................... 4913/71

[52] U.S. Cl. ................................................. 191/49
[51] Int. Cl. ............................................. B60l 5/00
[58] Field of Search .................. 191/45, 47, 48, 49, 191/50, 57, 59, 59.1, 66, 67, 68, 69, 70

[56] References Cited
UNITED STATES PATENTS

| | | | |
|---|---|---|---|
| 2,892,904 | 6/1959 | Sierk...................................... | 191/49 |
| 3,405,240 | 10/1968 | Kilburg ............................ | 191/45 R |
| 763,435 | 6/1904 | Slater..................................... | 191/49 |

Primary Examiner—Gerald M. Forlenza
Assistant Examiner—D. W. Keen
Attorney—Robert D. Flynn et al.

[57] ABSTRACT

A housing, holding sliding contacts, projects from the side of a tracked vehicle, the slide contacts engaging a current carrying member such as a current rail. The housing is mounted with a hinge connection to a link, the hinge itself being in turn pivoted to a bracket extending from the vehicle or the like towards the current carrying member. The hinges have hinge axes which are substantially parallel to the direction of travel of the vehicle, so that the shoe will be able to pivot and remain parallel to the current carrying rail, even if the distance of the tracked vehicle from the current carrying rail varies, and the rail itself curves. The bracket and hinge connection therein preferably is in form of a cradle, the current slide contacts being spring pressed towards the current carrying rail.

5 Claims, 4 Drawing Figures

ELECTRIC CURRENT COLLECTOR SHOE

The present invention relates to a current collector shoe to be used with an electrical transport unit to electrically interconnect a source of energy with the drive motor of a vehicle by means of a current carrying rail, and more particularly to the specific construction of the current carrying shoe to act as a current collector for movable cranes, hoisting, locating and transporting apparatus for use in factories and plants.

Transport units, such as transport dolleys, cranes, and other similar movable driven apparatus which utilize electric drive usually have electric current applied thereto over movable, or flexible conduit. If the transport unit need operate only within a limited range, then a flexible cable may suffice. If freedom of movement over greater distances must be ensured, however, then it is customary to utilize fixed current carrying rails which are engaged by sliding contacts on the transport unit, hereinfter simply called "vehicle." The vehicles here under consideration can be considered as guided, or tracked, in that they are to move over a predetermined path. The current carrying rails then are so mounted that they will have a fixed distance from the path, the current conductors or current sliders extending from the vehicle to contact the rails. Small changes in distance between the path of the vehicle and the current rails may arise. These changes may not exceed an amount which would lead to an interruption of electrical supply, or good contact, which might lead to arcing. It is therefore customary to make the sliding contacts to be relatively movable with respect to the vehicle so that the sliding contact will always engage the current carrying rail, for example under spring pressure, even though there may be small changes in the distance between the vehicle path and the current carrying rail.

Relative movability between the slide contacts and the vehicle usually suffices if the path of the vehicle is essentially straight or only slightly curved.

It is desirable to permit vehicle travel over greater and greater distances, and particularly automatically controlled travel which, in turn, requires the transport arrangements within plants and factories to conform to the requirements of the building. It is therefore frequently necessary that the path of travel of the vehicle not only extend in a straight line but has horizontal, vertical, inclined or curved paths. It is then no longer possible to provide a reliable electrical connection between a current carrying rail or a bus bar and a vehicle by providing only movable sliding contacts.

It is an object of the present invention to provide a contact shoe which enables secure and reliable contact to be made between a slide contact and a current carrying rail or bar and which is essentially independent of the track direction of a vehicle, and which permits variations in the path of the vehicle and the contact carrying bar, and the relative distances therebetween.

Subject matter of the present invention: Briefly, a housing is provided which holds therein movable, preferably spring pressed slide contacts to engage a current carrying rail. The housing itself is supported on a bracket by means of a link and hinge arrangement, the housing being hinged to a link and the link to the bracket, the hinge axes being substantially parallel to the direction of travel of the vehicle. The housing is thus suspended on a link arrangement which forms a parallel suspension, and is movable over a fair distance, while permitting tilting of the housing with respect to the current carrying conductor bars.

In a preferred form, the housing is hinged to the link at a point which is set back with respect to the sliding contact to avoid any possible contact of the housing or the links hinged thereto with the current carrying rails, even if the housing is substantially inclined or tilted about the links. Preferable, the housing is formed in separable parts, to permit ready replacement of the slide contact units themsleves.

The invention will be described by way of example with reference to the accompanying drawings, wherein.

Figure 1:
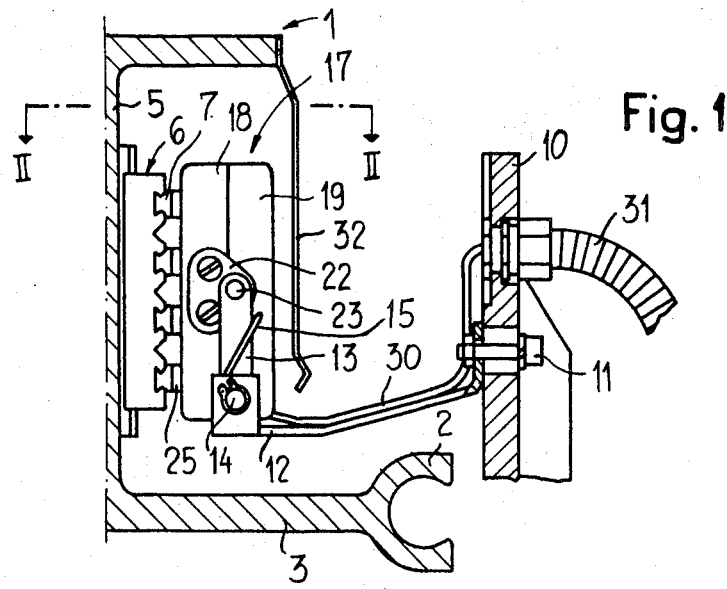
FIG. 1 is a schematic side view, partly in section, of a current collector shoe applied against current carrying bars.
Figure 2:
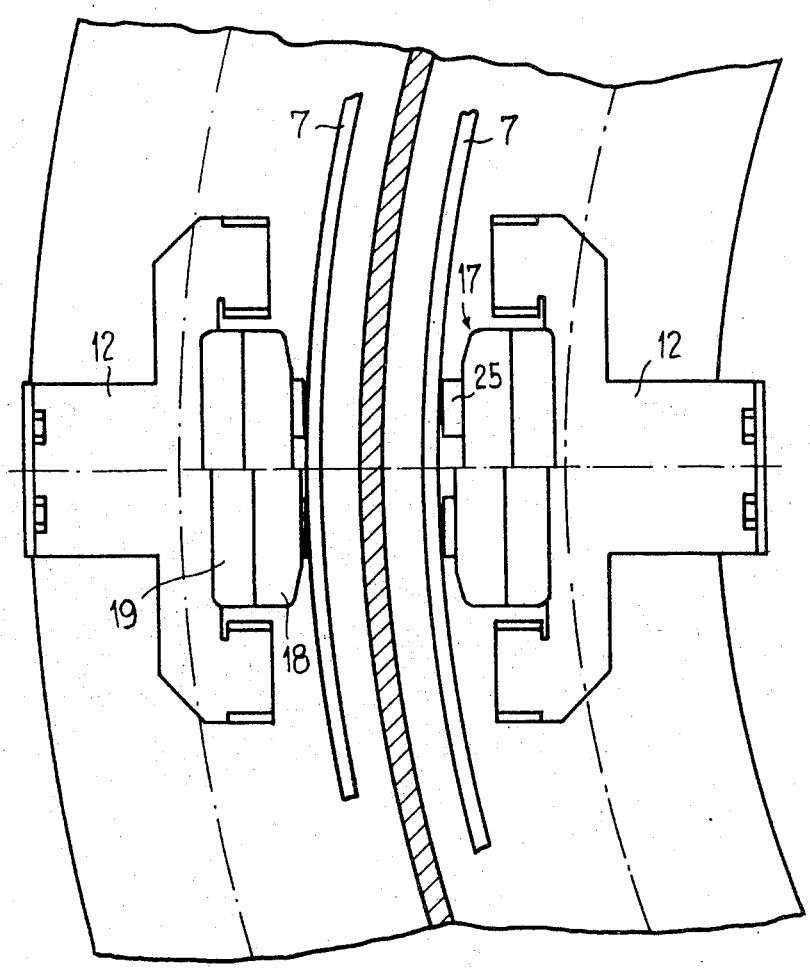
FIG. 2 is a part section, part top view of a dual unit of FIG. 1, taken along lines II—II of FIG. 1, with details omitted.

FIG. 1 illustrates only half of a current collector, it being deemed that the other half is the mirror image, along the chain-dotted center line, as best seen from the top of FIG. 2, where a pair of current collector shoes are indicated. The profile of the track arrangement, from which current is to be taken, is seen at 1; it is formed with an extension 2 which forms part of the guide track for the vehicle, the extension 2 being shaped to accept rollers, or wheels of a vehicle, not shown. A similar track 2 is located at the other side of the profiled body 1, as a mirror image thereof. The imaginary plane which passes through the two track sections 2 can be considered as the track plane, or plane of the path of movement. In the illustration shown, it is parallel to the extending portion 3 of the profile.

A holder 6 is secured to the vertical web 5 of the profiled body 1. Holder 6 may be a multi-part element which retains a plurality of current carrying tracks or bars 7, made for example of copper. The current carrying bars or rails, at their inner end, are shaped to be dove-tailed so that they can be held within the holder 6 and securely retained therein.

Figure 3:
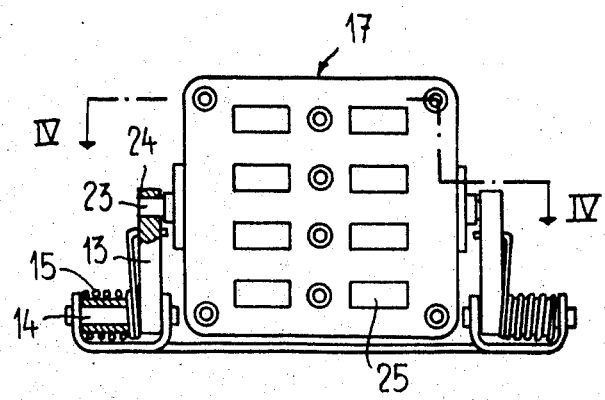
FIG. 3 is a front view, with slide contacts.

The vehicle, not further shown, has a sidewall 10 on which a bracket 12 is secured by means of screws 11. Bracket 12 has two links 13 pivoted thereon about pins 14 (see FIG. 3). A spring 15 acts against links 13 (FIG. 1) in a direction to press the links 13 towards the current carrying bars 7.

Figure 4:
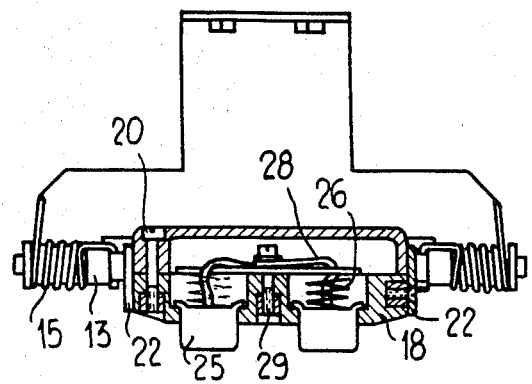
FIG. 4 is a section along line IV—IV of FIG. 3.

Links 13 on pins 14 form a cradle-like holder for a housing 17. Housing 17 has a front portion 18 and a rear portion 19, the two portions 18, 19 being held together by means of screws 20 (FIG. 4). Brackets 22 are secured to the front portion 18 of the housing 17 at both sides thereof, the brackets carrying a pin 23, the pins 23 being located in bores 24 of links 13, so that the housing 17 can pivot with respect to links 13. The brakkets 22 are secured to the front part 18 so that the rear portion 19 can readily be removed by loosening screws 20, without releasing the entire holder from the bracket 12. The pin 23 is, however, offset rearwardly, that is towards the rear portion 19 so that the links 13 are separated from the current carrying conductor bars 7 by a wide margin, and cannot touch the current conductors or come close thereto, even if the track curves sharply.

Bolts 14 and 23, together with the links 13 form pivoting joints whose axes are parallel to the track plane, or plane of path of travel, defined above. The front portion 18 of the housing 17 retains sliding contacts 25, such as carbon brushes. Preferably, at least two such brushes are provided for each current carrying bar 7. The brushes 25 are movable with respect to the forward portion of the housing 18 and are pressed forwardly by means of a spring 26 (FIG. 4).

FIG. 2 illustrates various relative positions of the housing 17 with respect to current carrying conductors 7. The lower half of FIG. 2 shows the position of the housing 17 when the sliding contacts 25 have been worn and do not project as far from the housing as they should. As FIG. 2 further shows, the relationship of the housing with respect to the bars differs depending upon the path of the conductor rails or bars, that is, whether the housing bears against a concave or a convex conductor bar 7. As can be seen from FIG. 2, contact between the conductor bars 7 and the sliding contact 25 is ensured at all times, which is obtained by the multiple linking of the housing 17 on the bracket 12. The actual holders of the housing 17 on the bracket 12 have been omitted from the showing of FIG. 2 for simplicity.

Contact buttons or brushes 25 are connected by means of a flexible conductor 28 to a screw 29 located in the front part of the housing 18. A cable 30 (FIG. 1) then leads over bracket 12 to the wall 10 of the vehicle, to be there taken through a cable duct 31 to the motor of the vehicle to be supplied with electricity.

Various changes and modifications may be made within the inventive concept.

I claim:

1. Electric current collector for tracked vehicles to connect an electric cable (30) with a current carrying conductor (7) comprising a housing (18, 19) and slide contacts (25) held in said housing and projecting therefrom, the slide contacts being adapted to engage the current carrying member and to slide relatively thereto upon movement of the tracked vehicle;

a support bracket (12) secured (11) to the vehicle (10) and extending towards the current carrying member;

two pairs of hinges (14, 23) having hinge axes substantially parallel to the direction of travel of the vehicle, one pair each located at a side of the housing, and two links (13), one each interconnecting the hinges of a pair, one hinge of a pair connecting the support bracket (12) and the respective link (13), and the other hinge of a pair connecting the respective link (13) and the housing (17, 18, 19), the links being located one at each side of the housing adjacent the walls thereof which extend substantially perpendicular to the direction of travel of the vehicle to guide the housing with the slide contacts in parallel to the current carrying member, and permit relative movement between the vehicle (10) and the current carrying member.

2. Collector according to claim 1, wherein the housing comprises two parts (18, 19) which are separable in a plane substantially parallel to the direction of travel of the vehicle, and substantially perpendicular to the track plane, the part (18) facing the current carrying member (7) carrying said slide contacts (25);

spring means (26) securing the slide contacts in the housing;

and openings for the cable formed in the other part (19) of the housing.

3. Collector according to claim 1, wherein the hinge (22, 23) connecting the respective link (13) and the housing (17) is set back with respect to the slide contacts (25) to provide for sufficient clearance of the link from the current carrying member even upon tilting of the housing with respect to the current carrying member.

4. Collector according to claim 1, wherein each of the pairs of hinges comprises individual pairs of hinge pins, one each hinge pin being located at one side of the housing, the bracket, the hinge pins, and the respective links forming a cradle to hold the housing for swinging movement about the hinge pins and lateral translation of the housing about the hinge pins by the interconnection of the hinge pins by the links.

5. Collector according to claim 1, including spring means bearing against the bracket (12) and the links (13) respectively, and tending to press the links, and hence the housing, towards the current carrying member.

* * * * *